July 7, 1925.
F. C. PEACE
1,544,597
RIM WITH REMOVABLE RING
Filed Oct. 12, 1922 2 Sheets-Sheet 1
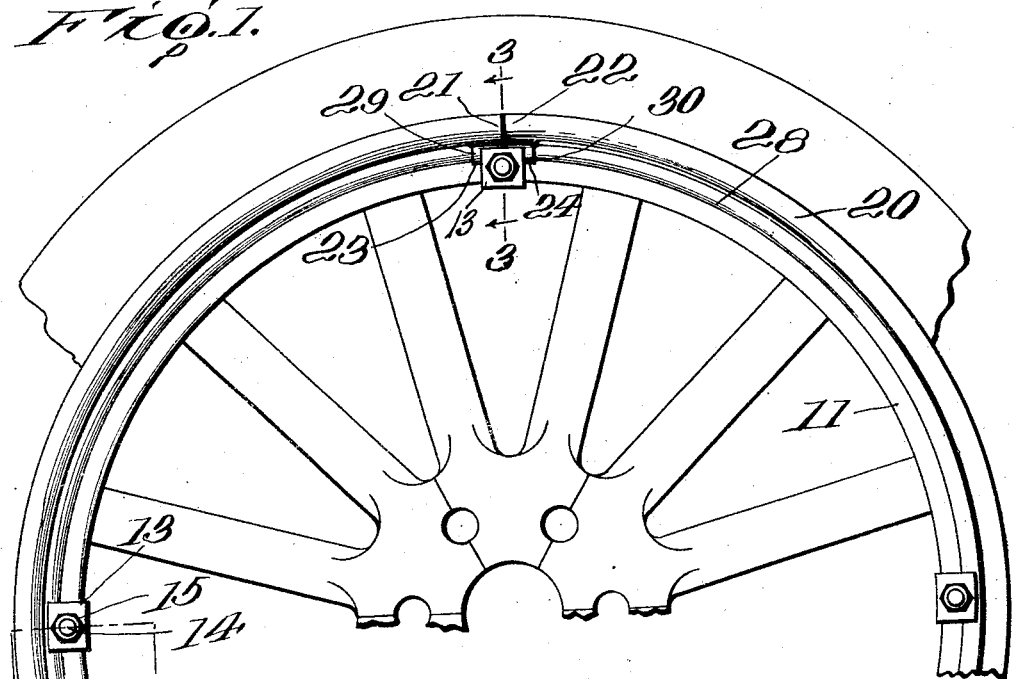
Inventor
F. C. Peace.
By Brower & Phelps
Attorneys July 7, 1925.
F. C. PEACE
1,544,597
RIM WITH REMOVABLE RING
Filed Oct. 12, 1922      2 Sheets-Sheet 2
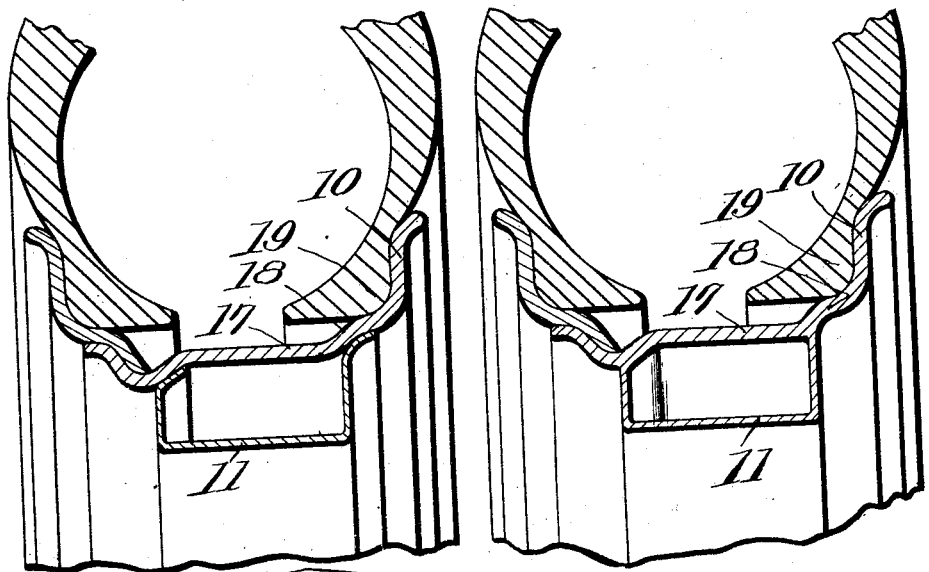
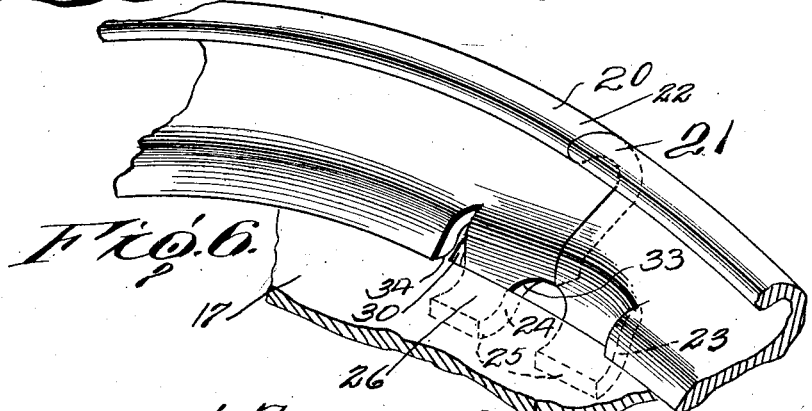
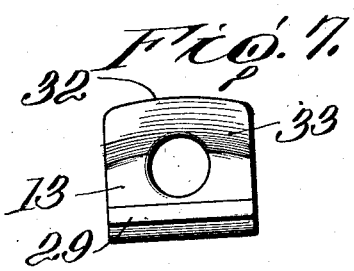
Inventor
F. C. Peace.
By Brown & Phelps
Attorneys Patented July 7, 1925.

1,544,597

UNITED STATES PATENT OFFICE.

FREDERICK C. PEACE, OF ATLANTA, GEORGIA.

RIM WITH REMOVABLE RING.

Application filed October 12, 1922. Serial No. 594,024.

*To all whom it may concern:*

Be it known that I, FREDERICK C. PEACE, a citizen of the United States, residing at Atlanta, in the county of Fulton and State of Georgia, have invented certain new and useful Improvements in Rims With Removable Rings, of which the following is a specification.

The invention relates to rims for pneumatic tires and has as an object the provision of a rim from which the tire may be readily removed. A further object of the invention is to provide a rim having a removable ring of a type which may be adapted for use with either clincher or straight side tires.

Illustrative embodiments of the invention are shown in the accompanying drawings, in which—

Fig. 1 is a side elevation partly broken away of a wheel, with a rim in place, embodying the invention;

Fig. 2 is a detail section on line 2—2 of Fig. 1;

Fig. 3 is a like section on line 3—3 of Fig. 1;

Figs. 4 and 5 are detail sections corresponding to Fig. 2 but showing a straight side tire upon a rim embodying the invention and a rim integral with the felloe, which rim embodies the invention, respectively;

Fig. 6 is a detail perspective view of a portion of the removable ring and of the rim, showing the coaction between the ends of the ring and a notch in the rim;

Fig. 7 is a side view, and

Fig. 8 is an end view of a form of clamp provided by the invention.

As shown in Figs. 2 and 3, the invention comprises a rim 10 adapted to be slipped upon the felloe 11 of a wheel and against a shoulder 12, being pressed thereagainst by means of clamps 13, through the medium of bolts 14 and nuts 15.

The rim 10 is preferably formed with an inwardly offset portion 17 providing a step 18 inwardly from the portion contacted by the bead 19 of the tire, by the provision of which structure the tire will slip readily off from the rim when released. To hold the tire upon the rim there is shown a ring 20, split to present ends 21—22, each provided with a downwardly extending portion 23—24, the ends of the portions 23—24 each terminating in a hook-shaped extremity 25 underlapping a portion 26 of the rim. As shown, the projections upon the ends of the ring are provided from the material of the ring by slitting the metal and by deflecting the portion thus partially severed from the portion of the ring immediately adjacent thereto, so that the hoops 25 may project laterally under the rim 17 at the bottom of the notch hereinafter described.

To coact with the ring 20 the rim is formed with a trough-shaped portion 27 and an upwardly and outwardly directed edge 28. The edge 28 is shown as cut away at 29—30 to provide a notch for reception of the two members 23—24 which lie side by side therein and are prevented from movement radially of the wheel by the action of the hooks 25.

To hold the extremities 23—24 from lateral movement one of the clamps 13 is shown in Fig. 1 as acting against the rim through the medium of the extremities 23—24 of the ring, said extremities being notched as at 33 for passage of the bolt 14.

To remove the ring preparatory to a removal of the tire, whether in the clincher or straight side form, or whether the rim be in place upon the wheel as an integral portion of the felloe, or secured thereto by means of clamps, the one clamp 13, which coacts with the parts 23—24, may be removed and one end, as 21, of the ring may be slipped diagonally upward and outward when the ring may be progressively slipped off from contact with the edge 28.

The ring 20 is shown as terminating at its inner edge in a sharp edge at 34 to assist in forcing the ring between the bead of the tire and the edge 28 of the rim. The application of the invention to the form of tires shown in Fig. 4 and to the form of rim and felloe shown in Fig. 5 requires no further description.

When the ring and rim in demountable form are assembled with a tire in place thereon and inflated but separate from the felloe the pressure of the tire will be held by the edge 28 coacting with the portion of the ring overlapping therewith and the ends 21, 22 of the ring are prevented from tipping outwardly by anchorage of hooks 25 under the rim at 26.

The form of clamp illustrated in Figs. 7 and 8 comprises an L-shaped member having a portion 29 adapted to coact with a shoulder 35, preferably struck inwardly from the middle of the felloe, and also a portion 31 shown as formed with a rounded edge 32 and as rounded upon its face, as at 36, in order that the portion 31 may fit as closely as possible upon the surface of the rim without special preparation of such surface for its reception.

Minor changes within the scope of the claim may be made in the physical embodiment of the invention without departing from its spirit.

I claim as my invention:

Means for supporting a pneumatic tire comprising, in combination, a rim, means at one side thereof for engagement of the tire, said rim having a channel adjacent its opposite side, the side of said channel flaring radially and laterally outwardly and having a notch cut in its edge, a divided ring, means on said ring for engagement with the second side of the tire, said ring fitting into said channel, projections on the ends of said ring struck from the material thereof entering said notch and projecting laterally under said rim at the base of said notch, and clamping means engaging the outsides of said projections to retain them in the notch.

FREDERICK C. PEACE.